(12) United States Patent
Cox

(10) Patent No.: US 6,631,379 B2
(45) Date of Patent: Oct. 7, 2003

(54) PARALLEL LOADING OF MARKUP LANGUAGE DATA FILES AND DOCUMENTS INTO A COMPUTER DATABASE

(75) Inventor: David A. Cox, Aurora, IL (US)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 09/773,196

(22) Filed: Jan. 31, 2001

(65) Prior Publication Data

US 2002/0112224 A1 Aug. 15, 2002

(51) Int. Cl.[7] .............................................. G06F 17/30
(52) U.S. Cl. ........................ 707/100; 707/101; 707/103; 707/104
(58) Field of Search ........................... 707/10, 100, 101, 707/103, 104

(56) References Cited

U.S. PATENT DOCUMENTS

| | | | |
|---|---|---|---|
| 5,764,916 A | * 6/1998 | Busey et al. | 709/227 |
| 5,778,378 A | * 7/1998 | Rubin | 707/103 R |
| 6,012,098 A | 1/2000 | Bayeh et al. | 709/246 |
| 6,083,276 A | 7/2000 | Davidson et al. | 717/1 |
| 6,125,391 A | 9/2000 | Meltzer et al. | 709/223 |
| 6,457,018 B1 | * 9/2002 | Rubin | 707/4 |
| 2002/0065957 A1 | * 5/2002 | Rubin | 709/330 |
| 2002/0112058 A1 | * 8/2002 | Weisman et al. | 709/227 |

* cited by examiner

Primary Examiner—Jean M. Corrielus
(74) Attorney, Agent, or Firm—Robert H. Frantz; David A. Mims, Jr.

(57) ABSTRACT

An XML Data Loader which employs the SAX parsing technology, provides an extendible architecture to generate SQL for each type of XML document to be loaded, and leverages multithreading and decoupling of processes to parse an XML file and to update a database. By using object-oriented programming methodologies, the system and method create new instances of the XML data loader for each XML file to be loaded into a database. Thus, many XML data files may be processed and loaded simultaneously, which minimizes system memory requirements, improves system reliability and memory management, and reduces processing time required from the start of processing an XML file to completing its loading into a database. The invention is applicable to other types of markup language documents, as well.

17 Claims, 5 Drawing Sheets

*Prior Art*

PARALLEL LOADING OF MARKUP LANGUAGE DATA FILES AND DOCUMENTS INTO A COMPUTER DATABASE

BACKGROUND OF THE INVENTION

1. Field of the Invention

This invention relates to the arts of data conversion and processing for loading database, and more specifically to loading text contained in document files which are in a markup language such as hyper text markup language ("HTML") and extensible markup language ("XML").

2. Description of the Related Art

Markup languages for describing data and documents are well-known within the art, especially Hyper Text Markup Language ("HTML"). Another well-known markup language is Extensible Markup Language ("XML"). Both of these languages have many characteristics in common. Markup language documents tend to use tags which bracket information within the document. For example, the title of the document may be bracketed by a tag <TITLE> followed by the actual text of the title for the document, closed by a closing tag for the title such as </TITLE>.

Hypertext documents, such as HTML, are primarily used to control the presentation of a document, or the visual rendering of that document, such as in a web browser. As such, many of the tags which are defined in the HTML standards control the visual appearance of the presentation of the data or information within the document, such as text, tables, buttons and graphics.

XML is also a markup language, but it is intended for primarily not for visual presentation of documents but for data communications between peer computers. For example, an XML document may be used to transmit catalog information from one server computer to another server computer so that the receiving server computer can load that data into a database. While XML documents maybe viewed or presented, the primary characteristics of the XML language provide for standardized interpretation of the data which is included, rather than standardized presentation of the data which is included in the document.

As such, XML is a highly flexible method or definition which allows common information formats to be shared both across computer networks such as the World Wide Web, and across intranets. This standard method of describing data allows users and computers to send intelligent "agents" or programs to other computers to retrieve data from those other computers. For example, an intelligent agent could be transmitted from a user's web browser or application server system to a plurality of database servers to gather certain information from those servers and return it. Because XML provides a method for the intelligent agent to interpret the data within the XML document, the agent can then execute its function according to the parameters specified by the user of the intelligent agent.

XML is "extensible" because the markup symbols, or "tags", are not limited to a predefined set, but rather are self-defining through a companion file or document called a Document Type Definition ("DTD"). As such, additional document data items may be defined by adding them to the appropriate DTD for a class of XML files, thereby "extending" the definition of the class of XML files.

XML is actually a reduced set of the Standard Generalized Markup Language ("SGML") standard. The DTD file associated with a particular class of XML documents describes to an XML reader or XML compiler how to interpret the data which is contained within the XML document.

For example, a DTD file may define the contents of an XML document (or class of documents) which are catalog page listings for computer products. In this example, the DTD document may describe an element "computer specifications." Within that element may be several data items which are bracketed by tags, such as <MODEL> and </MODEL>, <PART_NUMBER> and </PART_NUMBER>, <DESCRIPTION> and </DESCRIPTION>, <PROCESSOR> and </PROCESSOR>, <MEMORY> and </MEMORY>, <OPERATING_SYSTEM> and <OPERATING_SYSTEM>, etc. Thus, the DTD document defines a set or group of data items which are surrounded by markup tags or symbols for that particular class of XML documents, and it serves as a "key" for other programs to interpret and extract the data from XML documents in that class.

As in this example, an XML reader could be used to view the XML files, interpreting and presenting visually the contents of the XML files somewhat like a catalog page, and according to the DTD definitions. Unlike an HTML document, however, the XML document may be used for more data intensive or data communications related purposes. For example, an XML compiler can be used to parse and interpret the data within the document, and to load the data into yet another document or into a database. And, as described earlier, an intelligent agent program may be dispatched to multiple server computers on a computer network looking for XML documents containing certain data, such as computers with a certain processor and memory configuration. That intelligent agent then can report back to its origin the XML documents that it has found. This would enable a user to dispatch the intelligent agent to gather and compile XML documents which describe a computer the user may be looking to buy.

One common business application of XML is to use it as a common data format for transfer of data from one computer to another, or from one database to another database.

There are several tradeoffs with current XML implementations: performance, ease of use, and extendibility. Typically, performance is inversely related to ease of use, and often, extendibility is not an option. When loading data from an XML document into a database, the following steps typically occur by systems available currently:

(a) parsing of the XML file, which loads all the data contained in the XML file into system memory for use by the program;

(b) generating of database commands, such as SQL statements, to execute against the database to load the data from the XML file into the database; and (c) establishing communications to or a session with a database or database server, and (d) issuing the appropriate database commands to accomplish the data loading.

Turning to FIG. 1, the well-known process of loading an XML document into a database is shown. First, the entire XML document is loaded (1) into system memory (2). As some XML documents are quite large, and several documents may be being loaded simultaneously by one computer, this can present a considerable demand on system memory resources. Then, the entire XML file is parsed (3) for specific elements and data items according to the DTD file. This, too, tends to consume considerable system memory resources because XML files can be very large files. The most common parsing technology used in this step is referred to as "DOM." DOM is a process which loads an entire XML file into memory and then processes it until complete.

Next, after the data items and elements have been parsed from the XML file, SQL commands (or other database API commands) are generated (4) in order to accomplish the data loading into a database.

Last, the SQL commands are executed (5) in order to affect the loading of the data from the XML document into the database. Subsequently, any further XML documents to be parsed and loaded into the database are retrieved and processed one document at a time (6).

Thus, the commonly used process both consumes considerable system memory resources, and, because the process is executed in a linear stepwise fashion, it is inherently slow because it is only executing one task at a time, such as loading the XML document, parsing the XML document, or generating SQL commands. Further, because many database servers are remote to the actual XML loading server, the SQL commands may take considerable time to execute. Thus, the XML document content tends to stay resident in system memory for an unacceptably long period of time, and the system remains unavailable to start additional XML data file loading until the previous load is completely done.

Turning to FIG. 2, the linear processing nature of the commonly used process is shown. First, the XML data is loaded in the system memory (20), followed by parsing of the XML for an elements and data items (21). Next, the SQL commands to affect the loading of the database are generated (22) and then executed (23). During this entire period from start to ending, all of the XML files have to wait until the current XML file is processed. Thus, the time required to process and load an XML file (24) is the sum total of all the different stages as shown in FIG. 2.

Therefore, there is a need in the art for a system and method which efficiently uses system resources to load XML files into databases for data communications and business-to-business applications. This system and method should be compatible with common interfaces to data bases such as SQL, and must be compatible with common markup languages such as XML.

SUMMARY OF THE INVENTION

The XML Data Loader described herein employs the fastest, industry-standard XML parsing technology, provides an extendible architecture to determine the database commands to be generated for each type of XML document to be loaded, and leverages multithreading and decoupled processes to parse the XML and to update the database.

By using object-oriented programming methodologies, the system and method create new instances of the XML data loader for each XML file to be loaded into a database. Thus, many XML data files may be processed and loaded simultaneously, while minimizing system memory requirements, maximizing system reliability and memory management, and reducing the amount of time required from the start of processing an XML file to completion of loading into the database.

BRIEF DESCRIPTION OF THE DRAWINGS

The following detailed description when taken in conjunction with the figures presented herein provide a complete disclosure of the invention.

DETAILED DESCRIPTION OF THE INVENTION

The system and method of the present invention employs an object oriented programming methodology in order to allow for both multithreading of the processes and the decoupling of the processes into object classes. This realizes improved performance over the present technology as well as improved extensibility.

According to the preferred embodiment, a JAVA developer kit was used to develop the code for the system and method to be executed on any suitable application server computer such as an IBM personal computer, IBM RS-6000 computer, or IBM Mainframe. Also, in the preferred embodiment, the JAVA application programming interface ("API") for XML Parser for SAX is adopted. SAX is the parser module available from SUN Microsystems. Simple API for XML ("SAX") is an industry standard method for parsing XML documents one element at a time, instead of loading the entire XML document into system memory and processing the file completely from beginning to end. As will be seen in the following disclosure, this feature of the SAX parser helps achieve the decoupling and multithreading advantage of the system and method.

The database targeted by the XML loader in the preferred embodiment is the IBM DB2 version 7.0 database. And, according to the preferred embodiment, file transfer protocol ("FTP") is used to deliver XML files to the xml data loader over a computer network.

However, it will be recognized by those skilled in the art that alternate programming languages, parser technologies, XML file transfer technologies and database API's may be adopted without departing from the scope of the invention.

Figure 1:
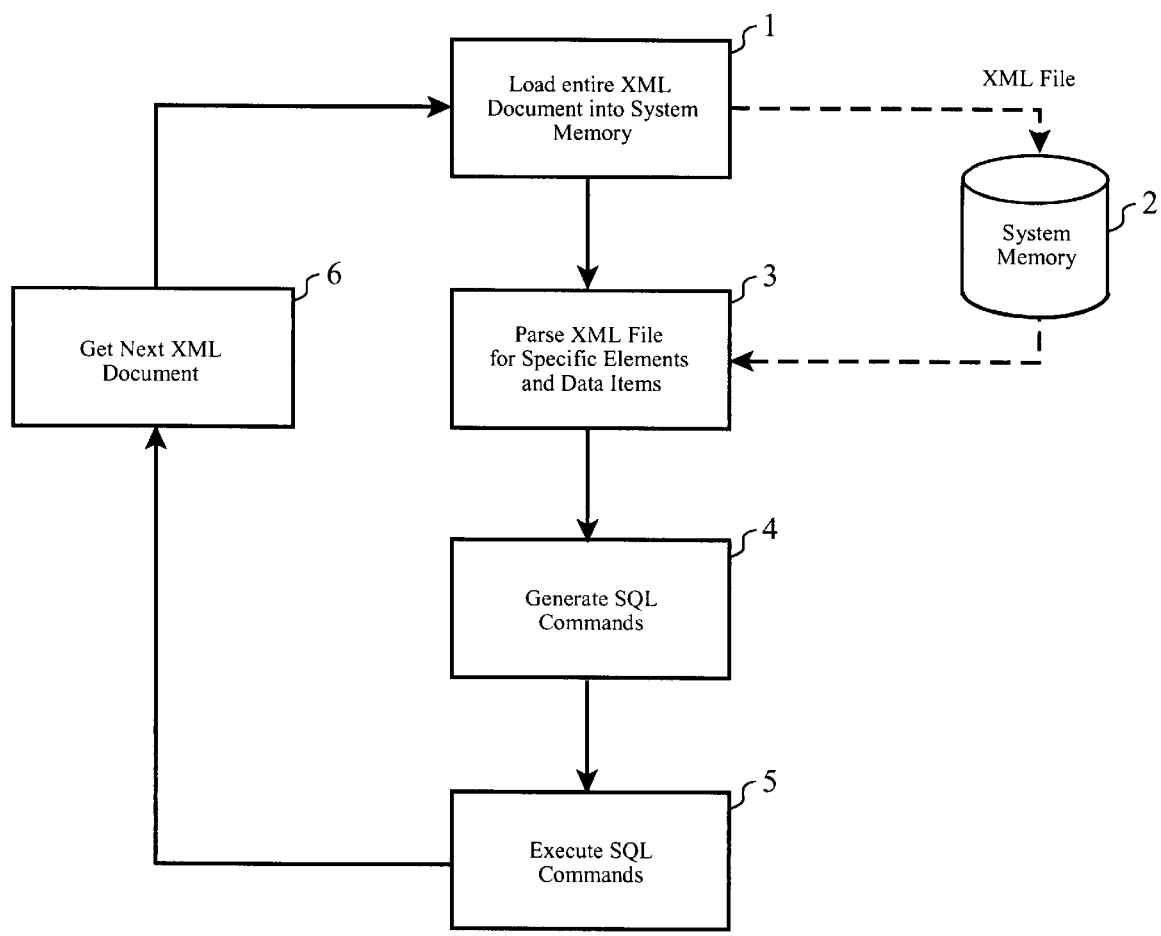
FIG. 1 shows the prior art method of loading an XML document into a database.
Figure 2:
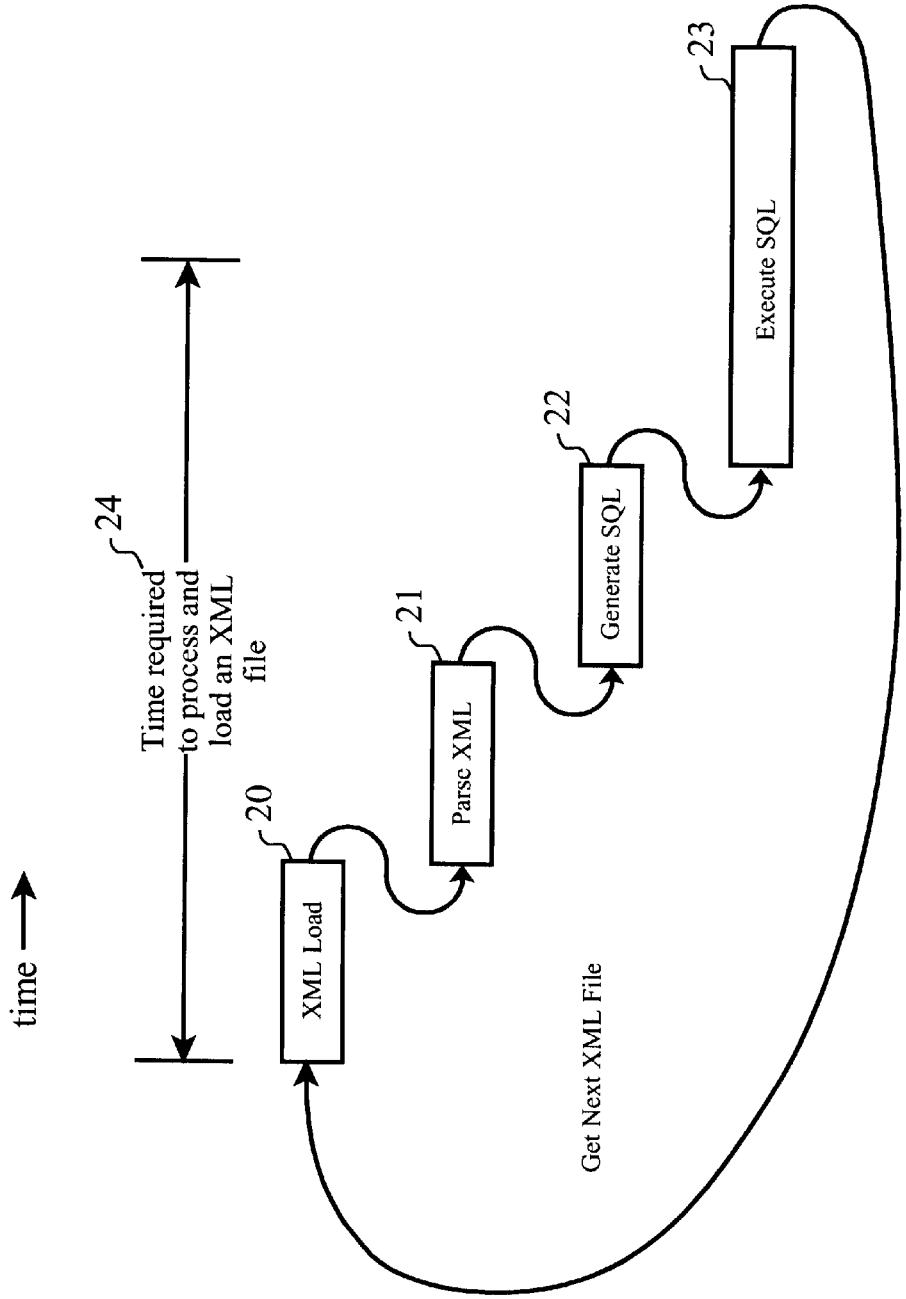
FIG. 2 illustrates the sequential, linear flow of the prior art method for loading an XML document into a database.
Figure 3:
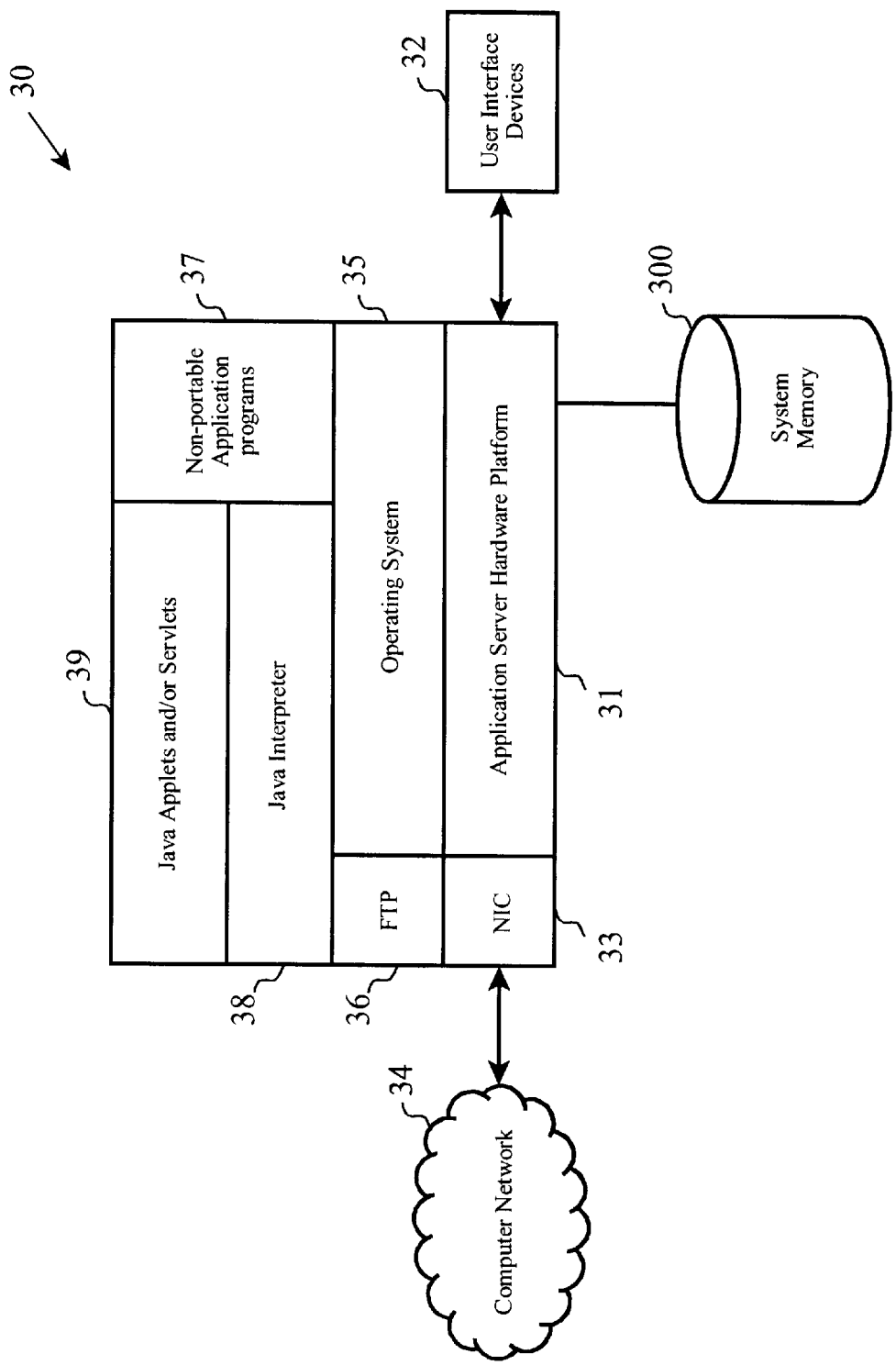
FIG. 3 discloses the computer system configuration employed in the preferred embodiment of the invention.

Turning to FIG. 3, the system configuration of the preferred embodiment is disclosed, which comprises an application server hardware platform (31), such as an IBM personal computer, an RS-6000 workstation, or IBM Mainframe. The application server (30) preferably includes a set of user interface devices (32), such as a keyboard, monitor, and mouse.

The application server (30) is also provided with system memory (300), such as random access memory ("RAM") and hard drive space, as well as a network interface card ("NIC") (33) to a computer network (34) for reception the XML files to be loaded via the File Transfer Protocol ("FTP") (36).

The application server (30) is also preferably provided with an operating system (35) such as Windows NT, Windows 2000, IBM AIX, or OS-2, or other suitable multitasking multithreaded operating systems. Because of the preferred implementation using JAVA, the choice of operating systems is somewhat inconsequential as long as the operating system supports execution of JAVA modules.

Additionally, the system is may be provided with any necessary non-portable application programs (37), such as a TCP/IP protocol stack or an FTP communications program, as well as a JAVA interpreter (38) in order to allow it to run multiple JAVA applets and/or servlets (39).

The remaining architecture and implementation of the invention is accomplished in several JAVA objects and classes, as described in more detail in the following disclosure.

Figure 4:
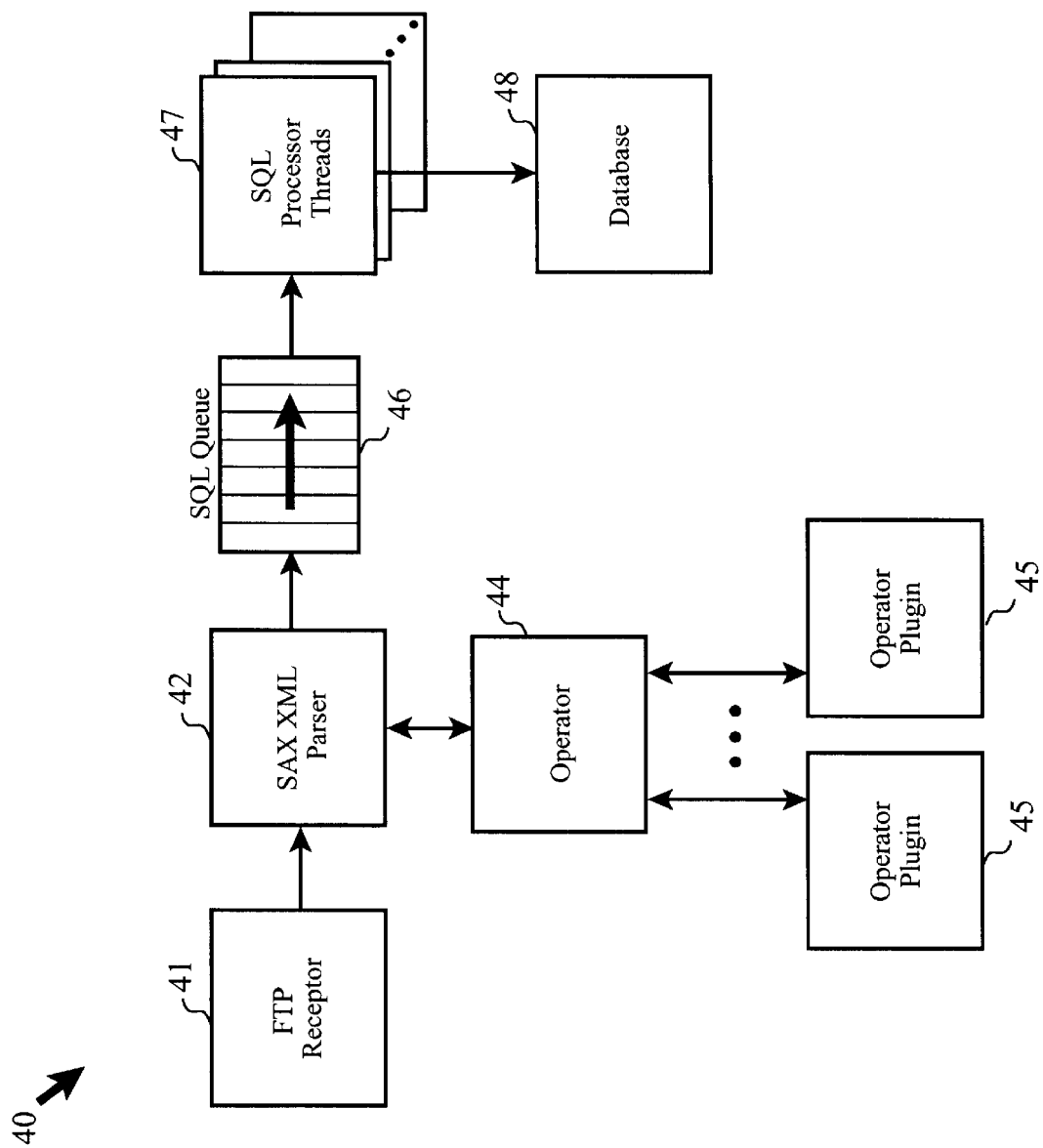
FIG. 4 sets forth the functional organization of the invention, including processes and queues.

Turning to FIG. 4; the processing flow implemented by the JAVA software executed on the application server platform is shown. In the preferred embodiment, the XML files are received via file transfer protocol through an FTP receptor (41). Alternatively, these files could be loaded onto the system using computer-readable media, or through another suitable network file transmission scheme.

A thread of the SAX XML parser (42) is instantiated to process the recently received XML file into XML elements. The Operator class (44) is called for each XML element to be processed.

The Operator class is used to store the attributes and child elements for the registered elements. This class returns the vector of SQL statements it generates, which are later used to update the database according to the XML data.

The Operator class (44) may have one or more operator plugins (45) which provide code specific for parsing XML elements for specific XML document types according to their DTD files, and for generating appropriate database API commands for those data elements. For example, one operator plugin may be provided to generate SQL commands for XML computer parts catalog pages. Another operator plugin may be provided to generate SQL commands for computer software specifications. Each plugin is called according to an XML document's DTD.

The Operator (44) generates database API commands, preferably SQL commands, in response to examination of the XML elements from the XML parser (42). The vector full of SQL commands is placed into an SQL Queue (46) for reception by the SQL processor threads (47), which execute the SQL commands.

The SQL Processor threads (47) may retrieve the queued SQL commands as they are ready for additional commands to execute in real-time. By executing the queued SQL commands the SQL Processor threads (47) update the database (48).

As can be seen in this diagram, the main stages of the invention, namely the SAX XML parser with the Operator class, and the SQL processor, are separated by the SQL queue (46), which allows them to run asynchronously and independently from each other. This decouples the processes in the processing timeline, which allows them to proceed at their fastest natural rate. It also allows for each process to release it's allocated system resources such as system memory as soon as it can complete, even though processes or threads downstream are not yet complete.

Further, the adoption of the use of the SAX XML parser allows for the first element found in the XML file to be immediately received by the Operator (44). As soon as the Operator (44) generates the first SQL command and places that into the SQL Queue (46), that command falls through the queue to be received immediately by the SQL processor (47). Thus, rather than in the process currently in use where the XML parsing of the entire file is completed before the SQL command generation is even started, the processes of the present invention are executed simultaneously in parallel in the system.

Figure 5:
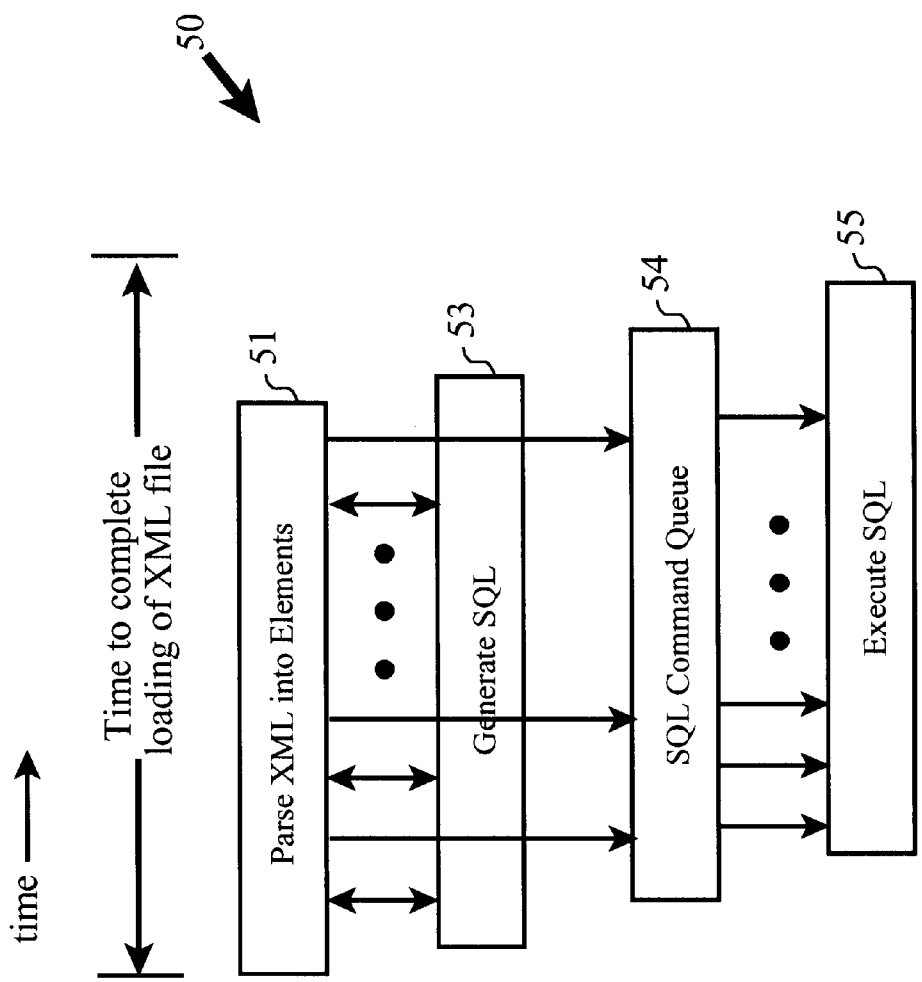
FIG. 5 illustrates the improved timeline achieved by the system and method due to a high degree of parallelism and decoupling of the processes.

Turning to FIG. 5, the timeline associated with the completion of loading an XML file into the database according to the invention is shown. As can be seen from this figure, many of the processes run in parallel and are decoupled from each other via the queues. The parsing of the XML into elements (51) yields an element almost immediately after the beginning of the process by using the SAX method. Thus, when the first element is found and parsed, it is available for the SQL command generator to receive. Then, as the generation of the SQL (53) yields the first SQL command to be executed, the SQL command is placed in the SQL command queue (54). This SQL command will immediately fall through the empty queue on the first entry, and will be received by the waiting SQL execution thread where it will then be implemented (55).

Thus, a high degree of parallelism is achieved which minimizes the time from the very beginning of the parsing of the first element of the XML files to the completion of the execution SQL commands to update the database.

The system and method of the present invention achieves a fast and extendible process, having the following components:

(a) a Loader, which is adapted to parse the XML file and determine which Operator extension(s) to call to determine the appropriate database command statements;

(b) an Operator, which comprises extendable object classes, Java classes, that generate the appropriate database command statements; and (c) a Database Updater, which is a multi-threaded Java program adapted to update a database by executing the generated database command statements.

As previously mentioned, SQL database command statements are generated to update an IBM DB2 database in the preferred embodiment, but alternate database API's and databases can be equally well adopted for the invention.

The Loader can parse any XML file, according to its companion DTD file. The parser technology preferably used is a SAX process, such as Sun Microsystem's SAX3, available as an object, which parses one element in the XML file at a time as opposed to the DOM process of parsing the entire XML file before yielding any results. This allows for each individual element to be processed immediately by the Operator, as opposed to waiting for the extire XML file to be parsed before starting the database command generation.

Once an XML element is read from the XML file, all of the attributes of the element are stored in a hashtable in memory. Once parsed, the program can determine which Operator extension to call based on the element type retrieved out of the XML file. The SQL statements are input into the SQL queue, where they may be retrieved by the Database Updater and executed in order to update the database. Meanwhile, the Loader is free to be processing the next element in the XML file.

The Operator class is used to realize an extendable architecture. Whenever a new XML format is defined in a new DTD file, an appropriate Operator class is created. This class will be able to read a hashtable full of the attributes associated with the XML DTD format and generate the appropriate SQL statements. This allows for an unlimited number of XML file formats to be processed by the system by extending the architecture through inclusion of additional Operator plugins.

The Database Updater executes the queued SQL statements in order to update and load the data into the database. Since the Database Updater is preferably developed for a multi-threaded Java environment, many updates to the database can be accruing simultaneously while the XML file is still being parsed by the Parser, and while the Operator is generating SQL statements.

During system configuration, an administrator may preferably set a maximum number of threads to be executed at any given time, in order for the application to be tailored to the environment or platform on which it is being executed. Typically, platforms equipped with more powerful processors or multiple processor can support more threads since they have more memory and faster processors.

It will be recognized by those skilled in the art that many variations and alternates may be adopted from the illustrative examples and preferred embodiment as disclosed herein without departing from the spirit and scope of the invention. Such variations may include, but are not limited to, adoption of alternate markup language standards, alternate parsing methods, alternate programming languages, alternated hardware platforms and operating systems, and alternate databases and database API's. Therefore, the scope of the invention should be determined by the following claims.

What is claimed is:

1. A method for loading markup language data files and documents into a computer database, said markup language data files containing data items and elements, said database having an application programming interface for modifying contents of the database through database command statements, said method comprising the steps of:
    parsing a markup language data file one element at a time according to a format description, each of said elements being immediately available for further processing without waiting for subsequent elements to be parsed;
    generating one or more database command statements immediately responsive to the availability of said elements such that said command generation and parsing occur substantially simultaneously;
    storing each of said generated database command statements in a database command statement queue immediately upon their generation; and
    executing said queued database command statements such that a database is updated substantially simultaneously with said step of parsing a data file in order to achieve loading of data from said markup language data file into a database.

2. The method as set forth in claim 1 wherein said step of parsing a markup language data file comprises parsing an extensible markup language ("XML") file.

3. The method as set forth in claim 1 wherein said step of parsing a markup language data file comprises parsing an extensible markup language ("XML") file using a Simple Application Programming Interface for Extensible Markup Language ("SAX") method.

4. The method as set forth in claim 1 wherein said step of generating one or more database command statements comprises generating structured query language ("SQL") database application programming interface command statements.

5. The method as set forth in claim 1 wherein said step of executing said queued database command statements comprises executing structured query language ("SQL") database application programming interface command statements.

6. A computer readable medium having program code stored therein for loading markup language data files and documents into a computer database in a computer system, said markup language data files containing data items and elements, said database having an application programming interface for modifying contents of the database through database command statements, said program code when executed by a computer system causing the computer system to perform the steps of:
    parsing a markup language data file one element at a time according to a format description, each of said elements being immediately available for further processing without waiting for subsequent elements to be parsed;
    generating one or more database command statements immediately responsive to the availability of said elements such that said command generation and parsing occur substantially simultaneously;
    storing each of said generated database command statements in a database command statement queue immediately upon their generation; and
    executing said queued database command statements such that a database is updated substantially simultaneously with said step of parsing a data file in order to achieve loading of data from said markup language data file into a database.

7. The computer readable media as set forth in claim 6 wherein said program code for performing the step of parsing a markup language data file comprises program code for parsing an extensible markup language ("XML") file.

8. The computer readable media as set forth in claim 7 wherein said program code for performing the step of parsing a markup language data file comprises program code for parsing an extensible markup language ("XML") file using a Simple Application Programming Interface for Extensible Markup Language ("SAX") method.

9. The computer readable media as set forth in claim 6 wherein said program code for performing the step of generating one or more database command statements comprises program code for generating structured query language ("SQL") database application programming interface command statements.

10. The computer readable media as set forth in claim 6 wherein said program code for performing the step of executing said queued database command statements comprises program code for executing structured query language ("SQL") database application programming interface command statements.

11. A system for loading markup language data files and documents into a computer database in a computer, said markup language data files containing data items and elements, said database having an application programming interface for modifying contents of the database through database command statements, said system comprising:

- a markup language data file loader which is adapted to parse markup language data files on an element-by-element basis, each of said elements being immediately available for further processing without waiting for subsequent elements to be parsed; said loader being adapted to select and operate an operator extension;
- at least one operator extension operable by said loader, adapted to immediately evaluate each element as it is available from said loader and to generate database application programming interface command statements such that said command generation and parsing occur substantially simultaneously; and
- a database updater adapted to execute said generated database application programming interface command statements in order to modify contents of a database substantially simultaneously with said loading and command generation.

12. The system as set forth in claim 11 wherein said loader is adapted to parse the extensible markup language ("XML") data files and documents.

13. The system as set forth in claim 11 wherein said operator extension comprises extendable object classes.

14. The system as set forth in claim 11 wherein said operator extension is adapted to generate structured query language ("SQL") database application programming interface command statements.

15. The system as set forth in claim 11 wherein said database updater adapted to update a database by executing structured query language ("SQL") database application programming interface command statements.

16. The system as set forth in claim 11 further comprising a file receptor for receiving markup language files from a computer network.

17. The system as set forth in claim 16 wherein said file receptor is adapted for receiving markup language files from a computer network via a file transfer protocol ("FTP").

\* \* \* \* \*